(12) United States Patent
Class et al.

(10) Patent No.: US 10,315,650 B2
(45) Date of Patent: Jun. 11, 2019

(54) CONTROL SYSTEM AND CONTROL METHOD FOR DETERMINING A PROBABILITY OF AN IMMINENT COLLISION OF A VEHICLE

(71) Applicant: TRW AUTOMOTIVE GMBH, Alfdorf (DE)

(72) Inventors: Uwe Class, Schechingen (DE); Karl-Heinz Glander, Monheim (DE); Martin Seyffert, Pfullingen (DE)

(73) Assignee: TRW AUTOMOTIVE GMBH, Alfdorf (DE)

( * ) Notice: Subject to any disclaimer, the term of this patent is extended or adjusted under 35 U.S.C. 154(b) by 203 days.

(21) Appl. No.: 15/381,238

(22) Filed: Dec. 16, 2016

(65) Prior Publication Data

US 2017/0217431 A1    Aug. 3, 2017

(30) Foreign Application Priority Data

Jan. 28, 2016   (DE) .................. 10 2016 000 943

(51) Int. Cl.
*B60W 30/09* (2012.01)
*B60R 21/0134* (2006.01)
(Continued)

(52) U.S. Cl.
CPC ......... *B60W 30/09* (2013.01); *B60R 21/0134* (2013.01); *B60W 10/184* (2013.01);
(Continued)

(58) Field of Classification Search
CPC ............ B60W 30/09; B60W 50/0098; B60W 10/184; B60W 10/20; B60W 10/30;
(Continued)

(56) References Cited

U.S. PATENT DOCUMENTS

| 8,958,953 B2 * | 2/2015 | Stabrey ................ B60T 8/1755 340/435 |
| 2004/0093160 A1 | 5/2004 | Knoop et al. |

(Continued)

FOREIGN PATENT DOCUMENTS

| DE | 102007039038 | 1/2009 |
| GB | 2412471 | 9/2005 |
| WO | 2005082681 | 9/2005 |

*Primary Examiner* — Jason Holloway
(74) *Attorney, Agent, or Firm* — Tarolli, Sundheim, Covell & Tummino LLP (57) ABSTRACT

A control system and corresponding control method which is adapted and intended for use in an own vehicle for detecting one or more objects based on environmental data obtained from one or more environmental sensors disposed at the vehicle. The environmental sensors are adapted to provide an electronic control unit of the control system with the environmental data which reflect the areas in front of, laterally next to and/or behind the vehicle. The control system is at least adapted and intended for detecting at least one object by means of the environmental sensors during a predetermined period of time or continuously. A movement of each detected object is determined. The presence of a rotational part in the movement of at least one object is identified, and when a rotational part is present, a probability of an occurrence of a collision between the corresponding object and the own vehicle is calculated.

15 Claims, 2 Drawing Sheets

(51) Int. Cl.
   *B60W 10/184* (2012.01)
   *B60W 10/20* (2006.01)
   *B60W 10/30* (2006.01)
   *B60W 30/095* (2012.01)
   *B60W 50/00* (2006.01)
   *G05D 1/02* (2006.01)
   *G08G 1/16* (2006.01)
   *B60R 21/01* (2006.01)

(52) U.S. Cl.
   CPC ............ *B60W 10/20* (2013.01); *B60W 10/30* (2013.01); *B60W 30/0956* (2013.01); *B60W 50/0098* (2013.01); *G05D 1/0238* (2013.01); *G08G 1/16* (2013.01); *G08G 1/166* (2013.01); *G08G 1/167* (2013.01); *B60R 2021/01231* (2013.01); *B60R 2021/01272* (2013.01); *B60W 2420/52* (2013.01); *B60W 2550/10* (2013.01); *B60W 2710/18* (2013.01); *B60W 2710/20* (2013.01); *B60W 2710/30* (2013.01); *G05D 2201/0213* (2013.01)

(58) Field of Classification Search
   CPC ......... B60W 30/0956; B60W 2420/52; B60W 2550/10; B60W 2710/18; B60W 2710/20; B60W 2710/30; B60R 21/0134; B60R 2021/01272; G08G 1/167; G08G 1/16; G08G 1/166; G05D 2201/0213; G05D 2021/01231; G05D 1/0238
   See application file for complete search history.

(56) References Cited

U.S. PATENT DOCUMENTS

| | | | |
|---|---|---|---|
| 2005/0012602 A1* | 1/2005 | Knoop | B60Q 9/008 340/435 |
| 2006/0267748 A1* | 11/2006 | Knoop | B60Q 9/008 340/435 |
| 2015/0266474 A1* | 9/2015 | Gustafsson | B60W 30/09 701/41 |
| 2017/0015315 A1* | 1/2017 | Hattori | B60R 21/0132 |
| 2017/0016740 A1* | 1/2017 | Cui | G01C 21/30 |

* cited by examiner

CONTROL SYSTEM AND CONTROL METHOD FOR DETERMINING A PROBABILITY OF AN IMMINENT COLLISION OF A VEHICLE

BACKGROUND OF THE INVENTION

A control system and control method for determining a probability of an imminent collision of a vehicle is disclosed herein. This system and method is based, in particular, on environmental sensors in vehicles and increases the safety for the occupants of the vehicle.

Prior Art

Today's advanced driver assistance systems (ADAS) provide a plurality of monitoring and information functions in vehicles for making driving a motor vehicle more secure. In this connection, the environment of the motor vehicle is monitored with respect to the driving course of the own vehicle based on environmental data obtained from one or more environmental sensors disposed at the vehicle.

Known driver assistance systems monitor, for example, whether the vehicle is located within a lane and whether the driver inadvertently drifts towards one side of the lane or is about to leave the same. So-called "blind-spot detectors" are also part of today's driver assistance systems. These detectors detect, for example by means of radar, lidar, video or the like, whether another vehicle, road user or object is located laterally of and/or behind the vehicle so that a collision might occur when changing the lane or turning off. In so-called adaptive cruise control (ACC) systems, an automatic cruise control of the own vehicle is adapted to the velocity of a preceding vehicle; wherein a certain distance to the preceding vehicle is always kept. In the systems described here, a direction of movement and/or velocity of the other vehicle is determined in order to prevent the own vehicle from crossing the path of the other vehicle in a manner resulting a critical situation. This does not relate only to lane changes and turning procedures but also to the prevention of rear-end collisions.

In vehicles driven by a person, these systems usually provide an information function in order to alert the driver to a critical situation or a corresponding maneuver. Likewise, the driver assistance systems can be employed (also in autonomously controlled vehicles) in order to actively intervene in the control of the vehicle. For example, emergency braking systems are capable of preventing a rear-end collision or at least taking action faster than the driver.

Underlying Problem

The monitoring of other vehicles or objects in the environment of the own vehicle is adapted to support the driver of the own vehicle since he/she will not always have a complete overview over all vehicles and objects in the environment. The known driver assistance systems or equivalent systems for autonomously controlled vehicles detect other vehicles and/or objects in the environment of the own vehicle. A direction of movement and/or velocity of another vehicle and/or object is calculated from the detected data and is compared to a direction of movement and/or velocity of the own vehicle.

However, the systems are all adapted to the fact that both the own vehicle and the other vehicle move on "normal" lanes. The systems thus assume that all vehicles and/or objects perform a linear movement or a possibly slightly curved movement following the course of the road. Thus, only translational movements are taken as a basis.

In case the own vehicle or another vehicle starts skidding or performs another unusual maneuver, this is not taken into consideration or otherwise included in control by conventional monitoring systems. For example, a skidding of the preceding vehicle is not identified as such by an ACC system. Thus, a possible imminent collision with the other vehicle is identified too late or not at all so that even an emergency brake application can no longer prevent the collision.

Suggested Solution

A control system which is adapted and intended for use in a vehicle detects objects based on environmental data obtained from one or more environmental sensors disposed at the vehicle. For this purpose, the environmental sensors are adapted to provide an electronic control unit (ECU) of the control system with the environmental data which reflect the areas in front of, laterally next to and/or behind the vehicle. The control system is at least adapted and intended for detecting at least one object by means of the environmental sensors during a predetermined period of time or continuously. The control system is at least adapted and intended for determining a movement of each detected object. Here, movement is understood to mean the tracking of a position of the object in space as a function of time. In addition, the control system is at least adapted and intended for identifying the presence of a rotational part in the movement of at least one object, and when a rotational part is present, calculating a probability of an occurrence of a collision between the corresponding object and the own vehicle.

In conventional environmental and assistance systems, only translational movements of the object (e.g. a stationary object or another vehicle) are detected and used for driver assistance. As a result, it can be determined whether the translational movement of the object or other vehicle crosses the translational movement of the own vehicle. However, when one of the movements is not exclusively translational but includes also a rotational part or at least follows a highly unusual trajectory, very rapid changes in velocity may occur, especially in a direction different from the original translational movement. Thus, the probability of a collision between the own vehicle and the object or other vehicle increases significantly. Identification of such an imminent collision by means of the conventional environmental and assistance systems is possible at a very late stage only and, in the case of a rotation of the own vehicle, not at all.

The solution suggested herein determines the probability of the occurrence of a collision between the own vehicle and the object or other vehicle. For example, it can be calculated whether the path of movement of the own vehicle crosses that of the monitored object, including the rotational parts in the respective movements. It can further be included in the calculation to what extent the own vehicle is still capable of changing its velocity and/or the own path of movement prior to the collision, i.e. is capable of reducing the probability of a collision. Based on this calculation that a collision is likely, the assistance systems and other (emergency) control systems of the own vehicle can be controlled and can react accordingly.

Further Embodiments and Advantageous Developments

The control system can be adapted and intended for calculating the probability of the occurrence of a collision between the own vehicle and the corresponding object based on a velocity, an original direction of movement, a magnitude of the rotational part in the total movement and/or a distance of the own vehicle and the object. For example, the probability of a collision is greater in the case of a higher velocity, directions of movement approaching each other, a higher rotational part and a lesser distance between the own vehicle and the object. Likewise, the probability of a collision can be considered to be greater, the higher the number of objects in the environment and/or on the future path of movement of the own vehicle. A narrow path (e.g. a narrow road) or little moving space of the own vehicle also increases the probability of a collision.

The control system can be adapted and intended for calculating a point of collision on the own vehicle, at which a collision with the object is likely to occur, taking into account the rotational part of the movement. In this connection, the paths of movement of the own vehicle and the at least one object including all identified rotational parts are projected (extrapolated) into the future. This enables the calculation of the position and orientation of the own vehicle and/or the at least one object relative to the own vehicle at specific future points of time. Based on the knowledge of the dimensions of the own vehicle and the dimensions of the at least one object detected from the environmental data, the point on the own vehicle can be determined, at which a collision with the at least one object is to occur or is likely to occur.

In addition, the velocity of the own vehicle or the relative velocity between the own vehicle and the object at the time of collision can be calculated. Also in addition or alternatively, the direction of movement of the own vehicle and/or the at least one object at the time of collision can be calculated. On the basis of this information, it is possible to determine a force of the collision (an impact) and/or a direction of impact. As a result, the collision event and especially the forces acting on the occupants can be determined or at least classified (lateral impact, oblique impact, frontal collision, etc.).

The control system can further be adapted and intended for comparing the calculated probability to a threshold value, and when the probability exceeds the threshold value, outputting a signal to at least one safety component of the own vehicle, wherein the at least one safety component is prepared for the collision. Merely by way of example, the threshold value can be between 35% and 75%, preferably 50%, 60% or 65%. The threshold value can, of course, also be set to other values lying above or below the mentioned values.

In addition or alternatively, the magnitude of the threshold value for each safety component prepared for the collision can be set individually or one or more threshold values for all or specific groups/classes of safety components can be set. General and specific key factors can be taken into account for setting one or more threshold values for a safety component. The general factors include, for example, whether the driver is currently in charge of driving or whether an autonomous (automated) driving is activated. Examples of specific key factors include a potential for distraction or surprise of the driver upon triggering of the safety component (low to highly likely) and a significance of the safety component in the entire passive safety system (necessary or "only" an additional contribution). For example, the triggering of an emergency brake application or a side airbag shortly before a collision will constitute a greater distraction or surprise of the driver than the triggering of a belt tensioning operation.

Thus, when setting the magnitude of the threshold value, it can also be taken into account what will happen when a collision occurs without triggering/activation of the safety component, and/or what will happen when a triggering/activation occurs without a subsequent collision. In the case of non-distracting safety components, which improve the inherently already sufficient safety, a very low value can be set, for which 1% is mentioned by way of example only. On the other hand, in the case of distracting safety components, for example safety components having a short deployment time, a high value could be set, for which >99% is mentioned also by way of example only.

Information on the individual safety components or groups/classes of safety components can be stored in a system configuration. The magnitude of the threshold value (threshold values) can be determined and set based on the system configuration.

The signal can be a data signal, wherein corresponding information relating to the collision is included in the signal. Alternatively, it can also be a sequence of signals, wherein initially one signal indicates an imminent collision and additional information, for example from the calculation results, is transmitted to the safety component in further signals. This additional information can also be retrieved by the safety component upon receipt of a first signal from the control system.

The at least one safety component can comprise an airbag and/or a belt tensioning system. Based on the signal, the airbag and/or the belt tensioning system can optimize a triggering time for the collision. Naturally, also a plurality of airbags and/or belt tensioning systems for various seats or groups of seats of the vehicle can optimize a triggering time for the collision. One or more airbags and/or an irreversible belt tensioning system (e.g. an explosive-activated belt tensioning system) can be prepared shortly before the collision. The point of collision can also be used for preparing the safety component(s). For example, side airbags can be prepared for a collision from the corresponding side so that the proper airbags are triggered in the collision at the right time. An example of a preparation of a safety component includes the lowering of a triggering threshold of an explosive-activated system (belt tensioner, airbag, etc.) for achieving an earlier triggering in the collision case.

In the case of a reversible belt tensioning system, this system can be triggered/activated shortly before the collision based on the signal. It can be triggered, for example 50 msec, 100 msec or 200 msec before the calculated collision time. Thus, the safety of the belted occupants can be improved.

Alternatively or in addition to the above explanations, the control system can be adapted and intended for comparing the calculated probability to a threshold value, and when the probability exceeds the threshold value, outputting a signal to at least one vehicle control component of the own vehicle. The at least one vehicle control component can influence a movement of the own vehicle in order to prevent the collision or reduce a force of the collision. The control system can at least try to change the movement of the own vehicle to such an extent that the relative velocity of the own vehicle and the at least one object is reduced to a possible minimum. The threshold value can be set to a value as described above.

In the case of a moving object, the path of movement of the own vehicle can, alternatively or in addition, be influenced in such a manner that the own vehicle and the at least one object hit each other in a favorable angle. In other words, it can be attempted to avoid an angle of impact which is unfavorable for the occupants of the own vehicle, such as e.g. a head-on collision with an oncoming other vehicle or a perpendicular side collision with a stationary object.

The at least one vehicle control component can comprise, for example, a brake system, a steering mechanism and/or at least a part of a drive train. The at least one vehicle control component can influence the movement of the own vehicle in such a manner that the collision occurs at a collision point favorable for the own vehicle. A favorable collision point is dependent on the velocity and the angle of impact present during the collision between the own vehicle and the at least one object. It can be attempted to change the angle of impact during the collision in such a manner that a crumple zone of the own vehicle is utilized as best as possible. By selectively decelerating and/or accelerating one or more wheels of the own vehicle, it can also be attempted, in the case of a lateral collision point, to shift that point towards the front or the rear to such an extent that it is located outside of the vehicle cabin. For example, the at least one vehicle control component can influence the movement of the own vehicle such that the collision point is located in the area of the fenders, trunk or motor compartment.

Furthermore, the at least one detected object can comprise another vehicle participating in the traffic. The control system can be adapted and intended for determining the movement of the other vehicle as an absolute path of movement of the other vehicle, and identifying the presence of a rotational part in the path of movement of the other vehicle. In other words, the control system can be adapted and intended for monitoring another vehicle while the own vehicle continues to drive on the planned path of movement (trajectory). The other vehicle is thus monitored as to whether it transitions into a rotation (skidding) or another unusual trajectory. A rotational part of the movement can, of course, also be identified from the start, for example, when the other vehicle arrives at the monitoring range of a first environmental sensor while already rotating. The identified rotational part is thus completely included in the movement of the other vehicle while the own vehicle continues to move on a normal translational path of movement. The control system can, of course, also treat a movement always as a relative movement of each detected/monitored object with respect to the (thought of stationary) own vehicle.

Alternatively or in addition, the at least one detected object can comprise a stationary object. The control system can be adapted and intended for determining the movement of the object as a relative movement to the own vehicle, and identifying the presence of a rotational part in the relative movement. Especially in this variant, the control system is more capable of acting upon the movement of the own vehicle to the effect that the collision and/or collision point is improved for enhancing the safety of the occupants or for completely preventing the collision.

A further aspect of the suggested solution relates to a control method which, in an own vehicle, detects objects based on environmental data obtained from one or more environmental sensors disposed at the vehicle. The method comprises the following steps:
- providing an electronic control unit in the own vehicle, by means of the environmental sensors, with environmental data which reflect the areas in front of, laterally next to and/or behind the vehicle,
- detecting at least one object by means of the environmental sensors during a predetermined period of time or continuously,
- determining a movement of each detected object,
- identifying the presence of a rotational part in the movement of at least one object, and
- when a rotational part is present, calculating a probability of an occurrence of a collision between the corresponding object and the own vehicle.

BRIEF DESCRIPTION OF THE DRAWINGS

Further objects, features, advantages and possible applications are apparent from the following description of non-limiting embodiments with reference to the accompanying drawings. All described and/or illustrated features, seen individually or in combination, show the subject matter disclosed herein irrespective of their grouping in the claims or the dependencies thereof. The dimensions and proportions of the components shown in the Figures are not necessarily to scale; they can deviate from what is illustrated here in embodiments to be implemented.

FIGS. 2A and 2B schematically show a second situation, in which a movement of the own vehicle relative to an object is determined by the own vehicle. FIG. 2A shows the movement of the own vehicle with respect to the stationary object, while

DETAILED DESCRIPTION OF THE DRAWINGS

Figure 1:
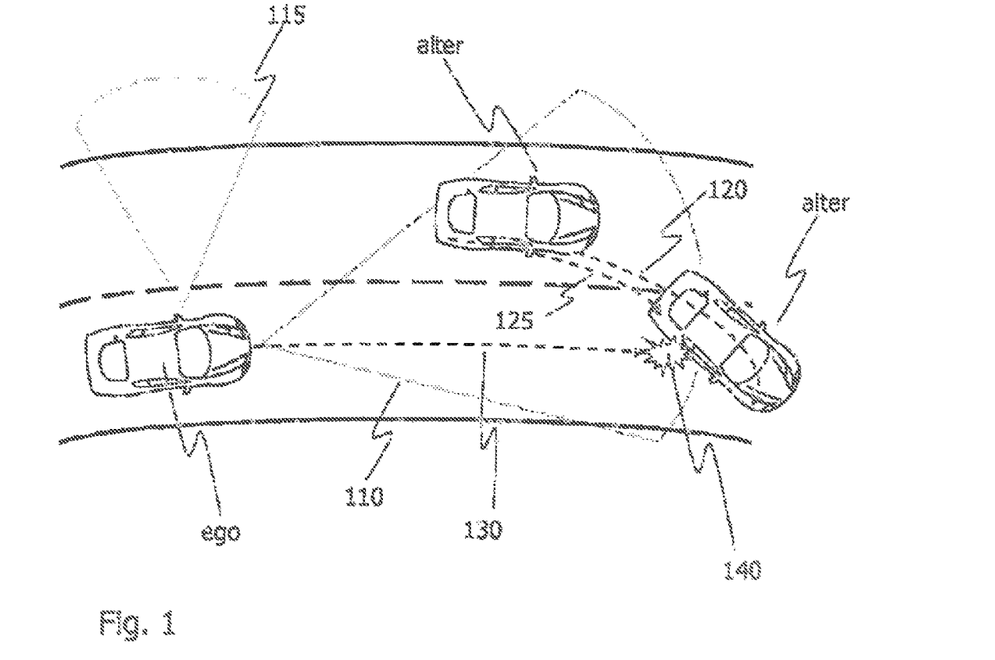
FIG. 1 schematically shows a first situation, in which a movement of a preceding vehicle is determined by an own vehicle.

FIG. 1 schematically shows a first situation, in which a movement of at least one object is determined by an own vehicle ego. FIG. 1 shows a preceding vehicle alter which represents the at least one object. Thus, in the following description of all Figures, it is referred to the preceding vehicle alter, however, it may be any object. An absolute movement (moving object) or only a relative movement (stationary object) can be determined for the object. The term "other vehicle" can thus be replaced by the more general term "object".

The own vehicle ego comprises a control system according to the present disclosure including an electronic control unit (ECU). For example by means of the ECU, the present control system can at least be adapted and intended for detecting at least one preceding vehicle alter by means of environmental sensors. This can be carried out during a predetermined period of time or continuously. For example, the ECU receives signals from environmental sensors, processes these signals and associated environmental data, and generates control and/or output signals. FIG. 1 shows two areas 110, 115 having the form of segments of a circle around the own vehicle ego which indicate monitoring areas of radar sensors which are not explained in greater detail. The radar sensors provide the electronic control unit ECU with radar signals regarding the distance of the at least one object.

In the variant shown in FIG. 1, both the own vehicle ego and the other vehicle alter move from the left to the right. The area 110 thus constitutes a monitoring area in front of the own vehicle ego, which is monitored by a front radar sensor. The area 115 constitutes an area laterally left of the own vehicle ego, which is monitored by a corresponding lateral radar sensor. FIG. 1 only shows these two areas for ensuring clarity of the drawing. Further environmental sensors, which monitor corresponding areas in front of, laterally next to and/or behind the own vehicle ego, can, of course, be disposed in front of, laterally next to and/or behind the own vehicle ego. The areas may also overlap each other and may include longer, shorter, wider and narrower areas than the illustrated segments of a circle.

The environmental sensors continuously detect objects, such as one or more other vehicles alter participating in the traffic, in order to determine parameters on the other vehicles alter. These parameters include, for example, velocity, position as a function of time, driving direction of the other vehicle(s) and, if applicable, also an angle of rotation of the other vehicle alter about its vertical axis. The parameters can be calculated from the sensor signals by the ECU. This information can alternatively be calculated by the radar sensor and transmitted directly to the ECU.

The here described control system which is adapted and intended for use in a vehicle comprises, apart from or instead of the radar sensors, further environmental sensors which serve the purpose of detecting the environment of the own vehicle ego and operate using a different technique, such as e.g. video, ultrasound, lidar, etc. The electronic control unit ECU processes the environmental data obtained from the environmental sensor(s) (radar sensor(s)) disposed at the vehicle for determining a movement of each detected object. For this purpose, the environmental sensors provide the electronic control unit ECU with the environmental data which reflect the areas in front of, laterally next to and/or behind the own vehicle ego. The ECU can determine the movement of each detected object therefrom over a certain monitoring period.

In addition, the ECU can calculate various degrees of freedom of the movement. Usually, the movement of another vehicle alter is a (almost exclusively) translational movement. However, in unusual situations, the movement of the other vehicle alter can also include rotational parts. These rotational parts can be determined by the ECU. The rotational parts are a rotational movement of the other vehicle alter about its vertical axis, wherein the total movement maintains a direction still corresponding to an initially determined translational direction of movement. In other words, in the case of an at least partial rotation, a corresponding deviation of the path of movement, as would result from a common steering or turning procedure, is missing.

It is also characterizing for a rotational movement that certain parts of the other vehicle alter describe different movements (different paths of movement) than other parts of the other vehicle alter. FIG. 1 schematically shows two arrows 120, 125 indicated in dashed lines. Arrow 120 represents the movement of the right front edge of the other vehicle alter, while arrow 125 illustrates the movement the right rear edge. These movements 120, 125 have different lengths and forms of path since the right front edge moves further to the right (towards the bottom in FIG. 1) than the right rear edge. The two movements 120, 125 are not translational movements which run parallel or concentrically. In other words, the other vehicle alter experiences a rotation about its vertical axis, i.e. its movement includes a rotational part.

Identification of a rotational part in the movement of the other vehicle alter can be carried out in various ways. For example, the dimensions (spatial extent) of the other vehicle alter can be detected depending on the angle of vision from the own vehicle ego to the other vehicle alter. Thus, a longitudinal axis and a transverse axis of the other vehicle alter can be determined. Now, when the longitudinal axis and the transverse axis of the other vehicle alter move relative to the direction of movement of the other vehicle alter, a rotational part (about the vertical axis) can be calculated.

Alternatively or in addition, one or more features of the other vehicle alter can be detected and tracked by the environmental sensors. An own path of movement can be determined for each one of these features. When these paths of movement do not run parallel, i.e. translational, to each other, a rotation of the other vehicle alter is present.

The solution suggested herein is not limited to a rotation about the vertical axis of the vehicle or object. Alternatively or in addition, also rotational parts of the movement of the other vehicle alter can be determined which relate to a rotation about the longitudinal axis and/or transverse axis of the other vehicle.

When the ECU has determined that a rotational part is present, a probability of an occurrence of a collision between the corresponding object and the own vehicle can be calculated.

Based on the determined movement of the other vehicle alter, this movement can be extrapolated into the future. The same can be done for a movement of the own vehicle ego. In FIG. 1, the path of movement 130 of the own vehicle ego is also indicated in form of a dashed arrow. The extrapolated movements (paths of movement 120, 125, 130) may now be compared to each other. When the paths of movement of the own vehicle ego and the other vehicle alter cross each other, there is a probability of a collision between the two vehicles. When the paths of movement 120, 125, 130 do not cross each other, the probability of a collision can be set to zero or to a very low value (less than 10% or 15%). The ECU can be adapted and intended for calculating the probability of the occurrence of a collision between the own vehicle and a corresponding object based on a velocity of the own vehicle ego or other vehicle alter, an original direction of movement of the own vehicle ego or other vehicle alter, a magnitude of the rotational part in the total movement and/or a distance of the own vehicle ego to the other vehicle alter. For example, the probability of a collision is greater in the case of a higher velocity, directions of movement approaching each other, a higher rotational part and a smaller distance, and is smaller in the reverse case.

Furthermore, the control system can be adapted and intended for calculating a collision point on the own vehicle ego, at which a collision with the other vehicle alter is imminent, taking into account the rotational part of the movement. By extrapolating the movements of the own vehicle ego and the other vehicle alter in FIG. 1 including the rotational parts included in the movements into the future, the collision point on the own vehicle ego can be determined taking into account the dimensions of the involved vehicles. The dimensions of the own vehicle ego can be stored in the ECU. The dimensions of the other vehicle alter can be determined from the environmental data obtained from the environmental sensors.

In addition, the control system is adapted and intended for comparing the calculated probability to a threshold value, and when the probability exceeds the threshold value, signaling this to one or more further components of the own vehicle ego. A signal can be output, for example, to at least one safety component of the own vehicle ego. The at least one safety component can be prepared for the collision by receiving the signal. The safety component can be, for example, an airbag or an explosive-activated belt tensioning system. A time of the collision can also be determined by means of the extrapolation of the paths of movement. The safety component(s) can thus be prepared for triggering or triggered shortly before the time of the collision. Here, "shortly before" can include, for example, approx. 5 msec to 50 msec, or a fixed value of, for example, 50 msec, 100 msec or 200 msec, depending on the safety component or triggering mechanism used. When also the collision point is known, individual safety components can be prepared for triggering or triggered in a selective manner. Especially in a collision occurring obliquely to the own vehicle ego, front airbags and side airbags can be selectively prepared or triggered for protecting the occupants of the own vehicle ego as best as possible. In the case of belt tensioning systems, these systems can also be configured as reversible systems. These systems can also be triggered shortly before the collision in order to better retain the occupants accordingly.

Alternatively or in addition to the above explanations, the control system can be adapted and intended for comparing the calculated probability to a threshold value, and when the probability exceeds the threshold value, outputting a signal to at least one vehicle control component of the own vehicle ego. The at least one vehicle control component can influence a movement of the own vehicle ego in order to prevent the imminent collision or to at least reduce a force of the collision.

These vehicle control components include, for example, a brake system, a steering mechanism and/or at least a part of a drive train. By selectively activating the brake system, intervening in the steering and/or accelerating one or more of the wheels of the own vehicle ego, the control system can lead the movement of the own vehicle ego away from the path of movement of the other vehicle alter and/or the determined collision point.

When the control system determines that the imminent collision cannot be completely avoided, the movement of the own vehicle ego can be influenced by selectively activating the vehicle control components to the effect that the collision occurs at a collision point favorable for the own vehicle ego. Here, a favorable collision point is understood to be a point on the own vehicle ego providing highest protection of the passenger cabin and thus of the occupants. For this purpose, the control system can also consider an impact angle, i.e. the angle between the path of movement of the own vehicle ego and the path of movement of the other vehicle alter. The velocity of the other vehicle alter caused by the rotational part of the movement can also be taken into account. The control system is configured such that the own vehicle ego is brought into a condition (position, orientation), in which the impact/force of the collision (the released kinetic energy) is best absorbed by the crumple zone and other structural elements of the own vehicle ego. As a result, the lowest load on the occupants can be accomplished.

The threshold value can be between 35% and 75%, especially 50%, 60% or 65%. The threshold value can, of course, be set to other values lying above or below the mentioned values. Different threshold values can be set for signaling to the at least one safety component and for signaling to the at least one vehicle control component. For example, the signal for preparing a safety component can be output at a lower probability than for a vehicle control component. The general and/or specific key factors mentioned at the beginning can also be taken into account when setting the threshold value.

Conventional systems merely alert the driver to a dangerous situation. Conventional systems can possibly reduce the velocity of the own vehicle ego, for example by means of an emergency brake application, in order to reduce a force of the collision.

By contrast, the present control system provides the advantage of checking the courses of movement of the involved vehicles for a potential collision based on an identified rotational part in the movement. Based on the deviation of the movement from an otherwise purely translational movement, the present control system is capable of reacting earlier to a dangerous situation. Due to the corresponding information transfer to the safety components and/or vehicle control components of the own vehicle ego, the occupants can be better protected and a collision can possibly be prevented.

The present control system has been described based on a rotational movement of another vehicle alter. Thus, the movement of the other vehicle alter can be determined as an absolute path of movement of the other vehicle alter. The presence of a rotational part in the movement is thus identified exclusively as a rotational part in the path of movement of the other vehicle alter. The control system can, of course, consider an own movement of the own vehicle ego for this purpose so that the absolute path of movement of the other vehicle alter can be calculated from the relative movement of the other vehicle alter detected by the environmental sensors.

Alternatively or in addition, the control system can also identify and consider a rotational part of a movement originating from the own vehicle ego. This will now be described with reference to FIGS. 2A and 2B. Elements described already with reference to FIG. 1 are denoted by identical reference numerals in FIGS. 2A and 2B and will not be explained again here.

Figure 2A:
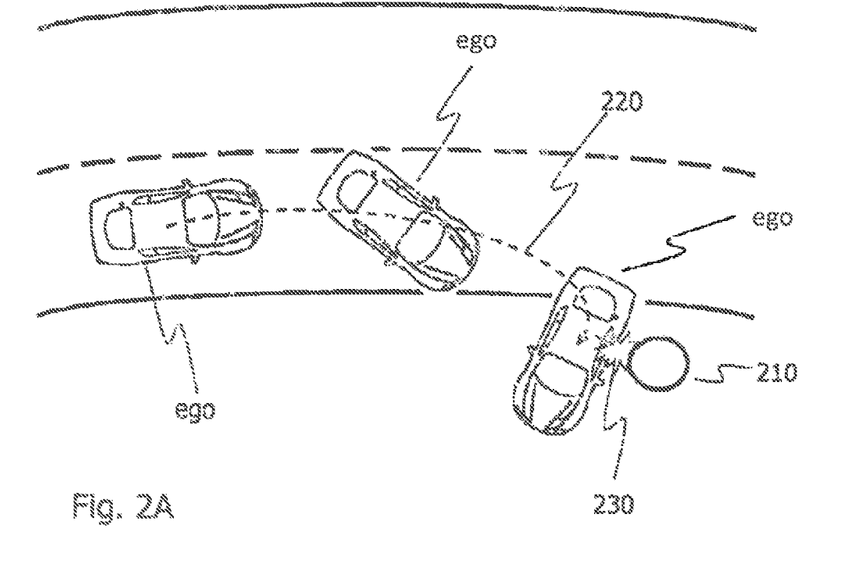
Figure 2B:
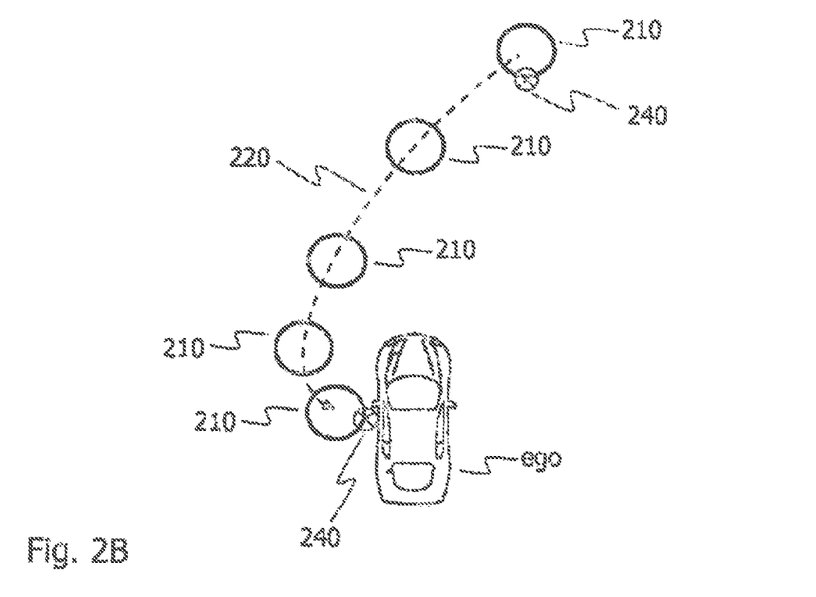
FIG. 2B illustrates the relative movement of the object from the perspective of a (thought of) stationary own vehicle.

FIGS. 2A and 2B schematically show a second situation, in which a movement of the own vehicle ego relative to a stationary object is determined by an own vehicle ego. FIG. 2A shows the movement of the own vehicle ego with respect to the stationary object 210, while FIG. 2B illustrates the relative movement of the object from the perspective of a (thought of) stationary own vehicle ego.

For the sake of clarity of FIGS. 2A and 2B, only the front monitoring area 110 of the own vehicle ego is indicated in FIG. 2B. The own vehicle ego can, of course, be equipped with a plurality of environmental sensors and comprise a corresponding variety of monitoring areas in front of, laterally next to and/or behind the own vehicle ego.

In FIG. 2A, the path of movement 220 of the own vehicle ego is again indicated in form of a dashed arrow. This time the movement of the own vehicle ego includes a rotational part which is clearly visible especially at the end of the path of movement 220. This movement of the own vehicle ego may lead to a collision with the stationary object 210 at the collision point 230 indicated in FIG. 2A with a certain probability.

The perspective shown in FIG. 2B clarifies the rotational part in the path of movement 220. In the case of a normal course of movement, the control system can determine a relative movement having a linear, at least translational course since the object 210 is a stationary object. In other words, the object 210 should always be located in the right-hand detection area 110 of the front environmental sensor. However, the control system can determine or extrapolate a path of movement 220 which crosses the longitudinal vehicle axis or which, put another way, leads through the detection area 110 from right to left. In case the object 210 already appears in the detection area 110 of an environmental sensor, it is possible that the control system initially determines a linear course of movement of the object 210. The path of movement 220 of the object 210 shown in FIG. 2B can then be detected in the further course of movement.

The determined movement comprises a rotational part also in this variant. This rotational part is not to be found in an actual rotation about a vertical axis of the object 210, since it is a stationary object. Rather, due to the rotation of the own vehicle ego about a vertical axis of the own vehicle ego, the path of movement 220 of the object 210 is curved. This curvature can be interpreted as a rotational part. However, from the perspective of the own vehicle ego, the object 210 rotates about its own axis, as can be clearly seen from the front side 240 marked in FIG. 2B. The control system can determine a rotational part of the movement of the object 210 from the curved path of movement 220 of the object 210 and/or from the "rotation" of the object 210 detected from the point of view of the own vehicle ego.

The control system is not limited to the examples described above and shown in FIGS. 1 and 2. Rather, the control system can also identify a rotational part of a movement which is composed of both, a rotation of the object, especially of the other vehicle alter, and a rotation of the own vehicle ego. With respect to the basic principle of the present disclosure, identifying a rotational part in a path of movement of the object, the own vehicle ego or a relative path of movement of the object from the perspective of the own vehicle ego is the cause for calculating the imminence of a collision.

Figure 3:
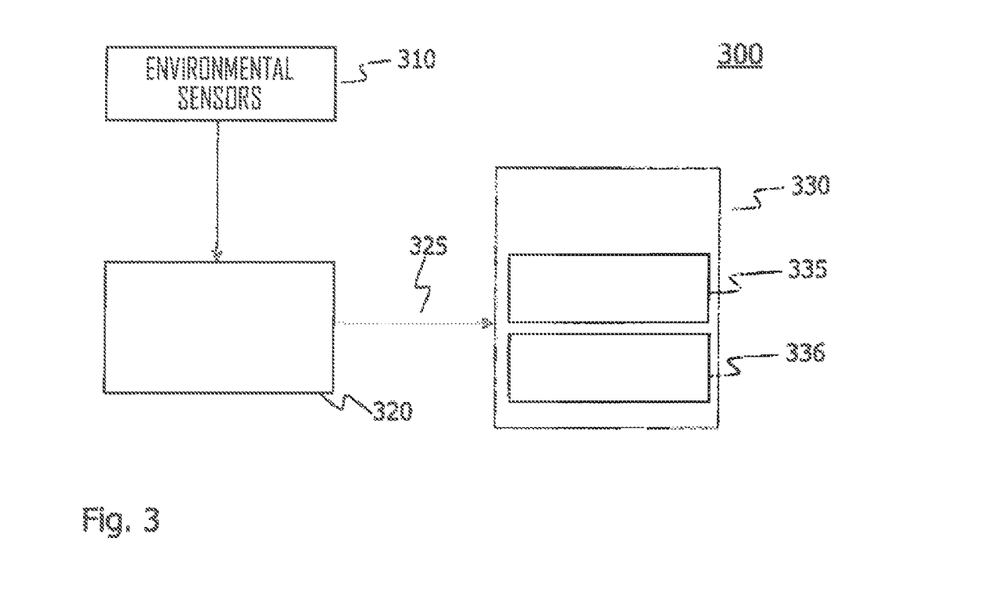
FIG. 3 schematically shows components of a control system.

Finally, FIG. 3 shows an exemplary control system 300 which is adapted and intended for use in an own vehicle ego for detecting one or more objects based on environmental data obtained from one or more environmental sensors 310 disposed at the vehicle ego. For this purpose, the environmental sensor(s) 310 is/are adapted to provide an electronic control unit 320 (ECU) of the control system 300 with environmental data which reflect the areas in front of, laterally next to and/or behind the vehicle.

The ECU 320 is at least adapted and intended for detecting at least one object by means of the environmental sensors 310 during a predetermined period of time or continuously, determining a movement of each detected object, and identifying the presence of a rotational part in the movement of at least one object. When a rotational part is present, the ECU 320 can calculate a probability of an occurrence of a collision between the corresponding object (object 210 or another vehicle alter) and the own vehicle ego. When a collision is imminent with a certain probability (threshold comparison and exceedance), the ECU 320 can output a signal 325 to at least one further component 330 of the own vehicle ego. This component may be a safety component 335 or vehicle control component 336 of the own vehicle ego. In the case of a safety component 335, this component can be prepared for the imminent collision based on the signal 325. Based on the signal 325, a vehicle control component 336 can influence a movement of the own vehicle ego in order to prevent the collision or reduce a force of the collision.

The above described variants and their structural and operational aspects are merely intended to improve the understanding of the structure, mode of operation and characteristics; they do not limit the disclosure to the embodiments. The Figures are, in part, schematic, wherein essential characteristics and effects are, in part, shown considerably enlarged for the sake of clarity of the functions, operating principles, technical configurations and features. Each mode of operation, principle, technical configuration and feature disclosed in the Figures or in the text can be freely and arbitrarily combined with all claims, each feature in the text and in the other Figures, other modes of operation, principles, technical configurations and features included in this disclosure or apparent therefrom so that all conceivable combinations of the described variants can be assigned accordingly. This includes also combinations between all individual explanations in the text, i.e. in each section of the description, in the claims, as well as combinations between different variants in the text, in the claims and in the Figures. The claims do not limit the disclosure and thus the possible combinations between all described features either. All disclosed features are explicitly disclosed herein, both individually and in combination with all other features.

The invention claimed is:

1. A control system (300) which is adapted to be used in a vehicle (ego) for detecting one or more objects, wherein one or more environmental sensors (310) disposed on the vehicle (ego) are adapted to provide an electronic control unit (320) of the control system (300) with environmental data which reflect the areas in front of, laterally next to and/or behind the vehicle (ego), and wherein the control system (300) is adapted to:
   detect at least one object (alter, 210) by means of the environmental sensors (310) during a predetermined period of time or continuously,
   determine a movement of each detected object (alter, 210),
   identify the presence of a rotational part in the movement of at least one object (alter, 210), and
   when the rotational part is present, calculate a probability of an occurrence of a collision between the corresponding object (alter, 210) and the vehicle (ego).

2. The control system (300) according to claim 1, which is adapted to:
   calculate a point of collision (140) on the vehicle (ego), at which a collision with the object (alter, 210) is likely to occur, taking into account the rotational part of the movement.

3. The control system (300) according to claim 1, which is adapted to:
   compare the calculated probability to a threshold value, and
   when the probability exceeds the threshold value, output a signal (325) to at least one safety component (335) of the vehicle (ego), wherein the at least one safety component (335) is prepared for the collision.

4. The control system (300) according to claim 3, wherein the at least one safety component (335) comprises an airbag and/or a belt tensioning system, wherein the airbag and/or the belt tensioning system optimizes a triggering time for the collision based on the signal.

5. The control system (300) according to claim 1, which is adapted to:
   compare the calculated probability to a threshold value, and
   when the probability exceeds the threshold value, output a signal (325) to at least one vehicle control component (336) of the vehicle (ego), wherein the at least one vehicle control component (336) influences a movement (130) of the vehicle (ego) in order to prevent the collision or reduce a force of the collision.

6. The control system (300) according to claim 5, wherein the at least one vehicle control component (336) comprises a brake system, a steering mechanism and/or at least a part of a drive train, wherein the at least one vehicle control component (336) influences the movement of the vehicle (ego) in such a manner that the collision occurs at a collision point (140) favorable for the vehicle (ego).

7. The control system (300) according to claim 1, wherein the at least one detected object (alter, 210) comprises another vehicle (alter) participating in the traffic, and wherein the control system (300) is adapted to:
   determine the movement of the other vehicle (alter) as an absolute path of movement (120, 125) of the other vehicle (alter), and
   identify the presence of a rotational part in the path of movement (120, 125) of the other vehicle (alter).

8. The control system (300) according to claim 1, wherein the at least one detected object (alter, 210) comprises a stationary object (210), and wherein the control system (300) is adapted to:
   determine the movement of the object (210) as a relative movement (220) to the vehicle (210), and
   identify the presence of a rotational part in the relative movement (220).

9. A control method which, in a vehicle (ego), detects one or more objects (alter, 210) based on environmental data obtained from one or more environmental sensors (310) disposed at the vehicle (ego), the method comprising the steps of:
   providing an electronic control unit (320) in the vehicle (ego) with environmental data which reflect the areas in front of, laterally next to and/or behind the vehicle by means of the environmental sensors,
   detecting at least one object (alter, 210) by means of the environmental sensors (310) during a predetermined period of time or continuously,
   determining a movement of each detected object (alter 210),
   identifying the presence of a rotational part in the movement of at least one object (alter 210), and
   when a rotational part is present, calculating a probability of an occurrence of a collision between the corresponding object (alter, 210) and the vehicle (ego).

10. The control method according to claim 9, comprising the step of:
    calculating a point of collision (140) on the vehicle (ego), at which a collision with the object (alter, 210) is likely to occur, taking into account the rotational part of the movement.

11. The control method according to claim 9, comprising the steps of:
    comparing the calculated probability to a threshold value, and
    when the probability exceeds the threshold value, signaling this to one or more further components (330) of the vehicle (ego).

12. The control method according to claim 11, wherein the signaling comprises:
    outputting a signal (325) to at least one safety component (335) of the vehicle (ego), wherein the at least one safety component (335) is prepared for the collision.

13. The control method according to claim 11, wherein the signaling comprises:
    outputting a signal (325) to at least one vehicle control component (336) of the vehicle (ego), wherein the at least one vehicle control component (336) influences a movement of the vehicle (ego) in order to prevent the collision or reduce a force of the collision.

14. The control method according to claim 9, wherein the at least one detected object (alter, 210) comprises another vehicle (alter) participating in the traffic, the method comprising the steps of:
    determining the movement of the other vehicle (alter) as an absolute path of movement (120, 125) of the other vehicle (alter), and
    identifying the presence of a rotational part in the path of movement (120, 125) of the other vehicle (alter).

15. The control method according to claim 9, wherein the at least one detected object (alter, 210) comprises a stationary object (210), the method comprising the steps of:
    determining the movement of the object (210) as a relative movement (220) to the vehicle (ego), and
    identifying the presence of a rotational part in the relative movement (220).

\* \* \* \* \*